(12) United States Patent
Ross

(10) Patent No.: US 11,871,046 B2
(45) Date of Patent: Jan. 9, 2024

(54) METHOD AND SYSTEM FOR PRODUCTION AND PRESENTATION OF LIVE PERFORMANCE WITH VIRTUAL VENUE TO PLURALITY OF REMOTE AUDIENCE DEVICES BY CLOUD-BASED INTERACTIVE VIDEO COMMUNICATIONS

(71) Applicant: Sandrell Nichole Ross, Austin, TX (US)

(72) Inventor: Sandrell Nichole Ross, Austin, TX (US)

( * ) Notice: Subject to any disclaimer, the term of this patent is extended or adjusted under 35 U.S.C. 154(b) by 14 days.

(21) Appl. No.: 17/559,344

(22) Filed: Dec. 22, 2021

(65) Prior Publication Data

US 2022/0210483 A1 Jun. 30, 2022

Related U.S. Application Data

(60) Provisional application No. 63/130,683, filed on Dec. 26, 2020.

(51) Int. Cl.
| | |
|---|---|
| *H04N 21/2187* | (2011.01) |
| *H04N 21/218* | (2011.01) |
| *H04L 65/1059* | (2022.01) |
| *H04L 65/401* | (2022.01) |
| *H04L 65/4053* | (2022.01) |

(52) U.S. Cl.
CPC ..... *H04N 21/2187* (2013.01); *H04L 65/1059* (2013.01); *H04L 65/4015* (2013.01); *H04L 65/4053* (2013.01); *H04N 21/21805* (2013.01)

(58) Field of Classification Search
CPC ........ H04N 21/2187; H04N 21/21805; H04N 21/47205; H04N 21/854; H04L 65/1059; H04L 65/4015; H04L 65/4053; H04L 65/1089; H04L 65/765; H04L 65/403
See application file for complete search history.

(56) References Cited

U.S. PATENT DOCUMENTS

| | | | |
|---|---|---|---|
| 2020/0404344 A1* | 12/2020 | Bathory | G06F 3/165 |
| 2021/0337245 A1* | 10/2021 | Meitus | H04N 21/439 |

* cited by examiner

*Primary Examiner* — Alazar Tilahun
(74) *Attorney, Agent, or Firm* — Artie Pennington Law Offices, PLLC; Artie Pennington; Hannah Ward

(57) ABSTRACT

A computer-implemented method for providing real-time interactive video communications of a show from a live performance space in relation to a virtual venue to an audience of attendee devices may include executing a live performance platform application to perform: providing an event session; managing a stream of images from a live video camera trained on the performance space; providing an event management dashboard; providing a performer dashboard to enable show performance functions; providing an attendee dashboard to enable audience attendee functions; providing a production suite dashboard to enable show production functions in relation to show production input including the stream of images and; providing show production output including show production features in relation to the show production input.

24 Claims, 17 Drawing Sheets

FIG. 13

METHOD AND SYSTEM FOR PRODUCTION AND PRESENTATION OF LIVE PERFORMANCE WITH VIRTUAL VENUE TO PLURALITY OF REMOTE AUDIENCE DEVICES BY CLOUD-BASED INTERACTIVE VIDEO COMMUNICATIONS

CROSS-REFERENCE TO RELATED APPLICATIONS

This application at the date of filing is not related to any other application or patent.

FIELD OF THE INVENTION

The disclosure relates to cloud-based platforms for video communications. Particularly, the disclosure relates to cloud-based platforms to enable production and presentation of live performances by video communications.

BACKGROUND OF THE INVENTION

Live performances such as theatrical productions, symphony concerts, opera, variety revues, dance performances, popular music concerts, live talk shows, and stand-up comedy shows are typically presented in first-person in a performance venue, such as a theatre having a stage dedicated to performances and audience seating facing the stage. The live performance is produced by one or more production engineers or managers physically located at the venue. A physical live event is produced where the attendees, performers, and production engineers are all in the same venue. Such performances may be recorded on video recording systems including one or more video cameras located in the same venue, to be re-broadcast, streamed, or downloaded for viewers in remote locations and at different times, even years after the live performance. Sophisticated televised broadcasts are generally produced by local producers located at the same venue in a production booth or suite, or in a set of specialized television production trailers connected by specialized cables to television cameras inside the live performance venue.

Cloud-based video conferencing platforms that enable general business communications and collaboration do not enable sophisticated production and presentation of live performances by video communications. There is a need for a cloud-based video production and communications platform to enable remote performances, production, communications and viewing of live performances. There is also need for such a cloud-based video production and communications platform to provide elements of virtual venues in association with live performances. Unless expressly stated to the contrary, the form of instantiation of any element of this disclosure shall be considered as being only a matter of design choice.

BRIEF SUMMARY OF THE INVENTION

Cloud-based video conferencing platforms for general business communications and collaboration, such as Zoom (Zoom Video Communications, San Jose CA) and Microsoft Teams (Microsoft Corporation, Redmond WA), are inadequate and do not enable sophisticated production and presentation of live performances such as theatrical productions, symphony concerts, opera, variety shows, and stand-up comedy performances. Virtual reality (VR) platforms such as the Oculus Virtual Reality platform (Meta Platforms Inc., Menlo Park CA) are more limited and for various reasons inadequate, and do not enable sophisticated production and presentation of live performances, in part because such virtual reality platforms require extensive specialized hardware and platform-specific software.

The above-mentioned shortcomings, disadvantages and problems are addressed herein, as will be understood by those skilled in the art upon reading and studying the following specification. This summary is provided to introduce a selection of concepts in simplified form that are further described below in more detail in the Detailed Description. This summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Disclosed subject matter includes a computer-implemented method for providing real-time interactive video communications of a show performed by performers from a live physical performance space in relation to a virtual performance venue to an audience of a plurality of attendee devices dispersed at remote locations apart from the live physical performance space. Such method may include providing a live performance platform application configured for operation in relation to a real-time interactive video communications platform. The real-time interactive video communications platform may be dedicated to performing a method as herein disclosed or, in an embodiment, may be a commercially available, general purpose, cloud-based video conferencing platform. Disclosed subject matter also includes a computer-implemented system for providing real-time interactive video communications of a show performed by performers from a live physical performance space in relation to a virtual performance venue to an audience of a plurality of attendee devices dispersed at remote locations apart from the live physical performance space. Such system may include providing a live performance platform application configured for operation in relation to a real-time interactive video communications platform. The real-time interactive video communications platform may be dedicated to a system as disclosed or, in an embodiment, may be a commercially available, general purpose, cloud-based video conferencing platform accessible by such system.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed description, and claims.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

Figure 13:
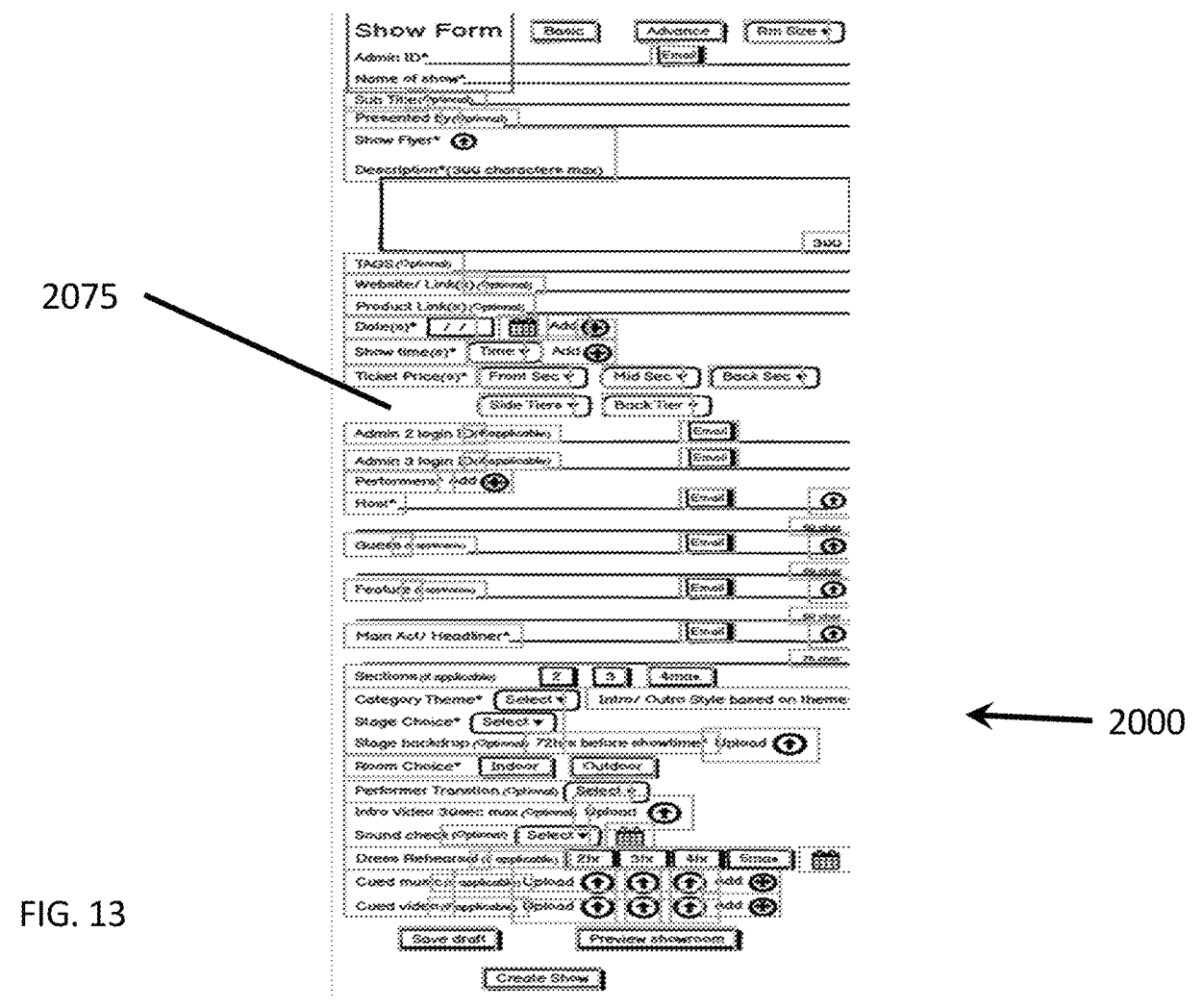

FIG. 13 is a simplified view of aspects of an event management dashboard of a computer-implemented system as shown generally in FIG. 2, depicting event management functions in relation to show form information.

Figure 1:
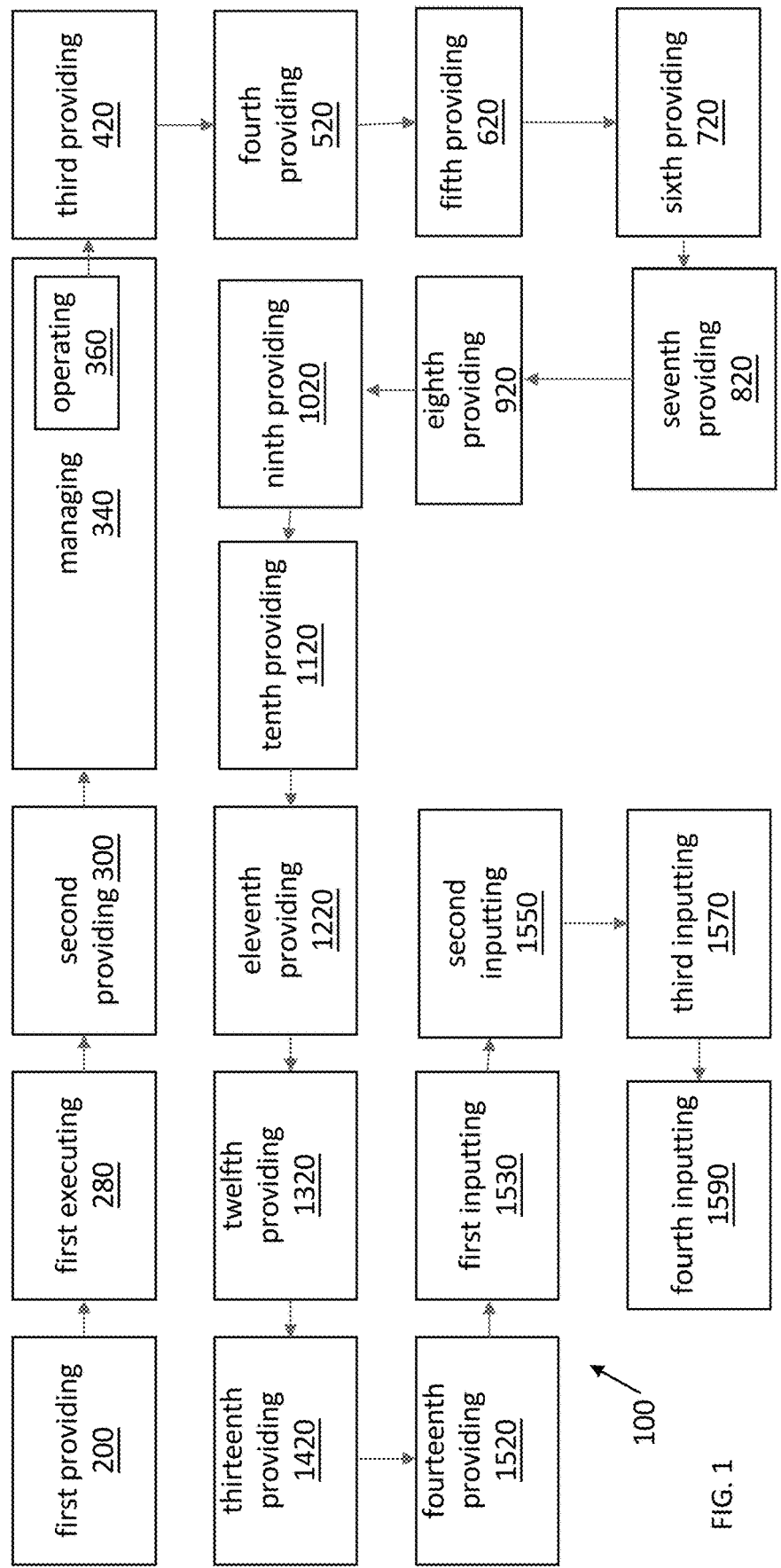
FIG. 1 is a simplified schematic diagram view of a computer-implemented method for providing real-time interactive video communications of a show from a live physical performance space in relation to a virtual performance venue to a remote plurality of attendee devices, in an embodiment.

In an embodiment, for example, the event management board functions may be selected from the following:

Remote show device in an embodiment may include show production functions of lighting of live performance space, which may be exclusive or in combination with other production functions.

Remote show device in an embodiment may include show production functions of transmitting live video feed, which may be exclusive or in combination with other production functions.

Remote show device in an embodiment may include show production functions of input and output of audio, which may be exclusive or in combination with other production functions.

Remote show device in an embodiment may include show production functions of scanning live performance space, which may be exclusive or in combination with other production functions.

DETAILED DESCRIPTION OF ILLUSTRATIVE EMBODIMENTS

In this detailed description, reference is made to the accompanying drawings which form a part hereof, and in which is shown by way of illustration specific embodiments which may be practiced. Reference now should be made to the drawings, in which the same reference numbers are used throughout the different figures to designate the same components. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures, and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Illustrated in FIG. 1 is a computer-implemented method 100 for providing real-time interactive video communications of a show performed by performers from a live physical performance space in relation to a virtual performance venue to an audience of a plurality of attendee devices dispersed at remote locations apart from the live physical performance space.

As shown in FIG. 1, method 100 may include first providing 200 a live performance platform application configured for operation in relation to a real-time interactive video communications platform. Referring to FIG. 1, method 100 may include first executing 280, by a processor, the live performance platform application configured to perform method steps as further described herein. First executing 280 thus may implement the live performance platform application.

Referring to FIG. 1, method 100 may include second providing 300 an event session corresponding to the live physical performance space. Such second providing 300 may be performed by the processor executing steps embodied in the live performance platform application. The event session may be controlled or configured by functioning of an event management dashboard receiving event management input in relation to administration input from an administrator or other user.

Referring to FIG. 1, method 100 may include managing 340 a stream of images of a live camera field of view captured by operating 360 a live video camera trained on the live physical performance space for the event session. Operating 360 thus may include training the live video camera on the live physical performance space and capturing the stream of images of the live camera field of view of the live video camera. In an embodiment, a plurality of the live video cameras may capture plural streams of images of plural, different live camera fields of view. Each of the live video cameras may be associated with respective camera variables such as, for example, camera angle. Operating 360 may also include live view in the virtual platform environment, which may show theater, seating, stage, wall, performer, and attendee views.

Referring to FIGS. 1, 13, 14 and 15, method 100 may include third providing 420 an event management dashboard configured to enable event management functions from a remote event management device for the event session. In an embodiment, for example, the event management functions may be selected from the following:
  determining an event session,
  determining an event date,
  determining an event time,
  determining an event duration,
  determining an event details,
  determining an event size,
  determining house lighting,
  determining house music,
  determining a ticket condition variable,
  determining audience seating information,
  determining audience subgroup information,
  determining audience invitation information,
  determining an audience variable,
  determining a photo-op variable,
  determining a souvenir purchase variable,
  determining a refreshment purchase variable,
  determining an event series subscription purchase variable,
  determining a virtual venue walking route variable,
  determining an intermission variable,
  determining a voluntary financial contribution variable,
  determining an attendee count variable,
  determining an attendee selection variable,
  determining an attendee mute variable,
  determining an event page variable,
  determining a green screen performers variable,
  determining an advertisement variable, and
  determining said event stats variable.

Figure 3:
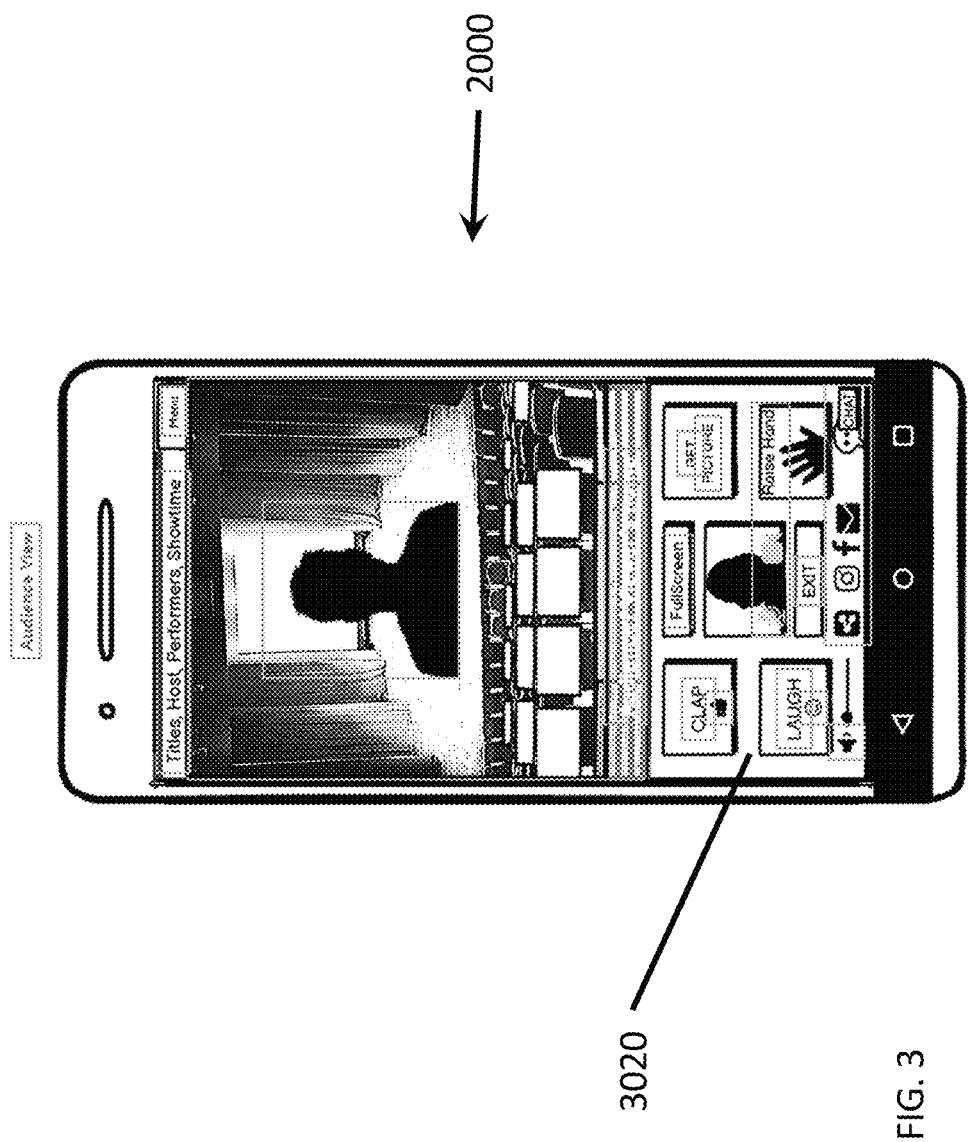
FIG. 3 is a simplified view of aspects of an attendee dashboard of a computer-implemented system as shown generally in FIG. 2, with a front view of a live performances on a virtual stage.
Figure 4:
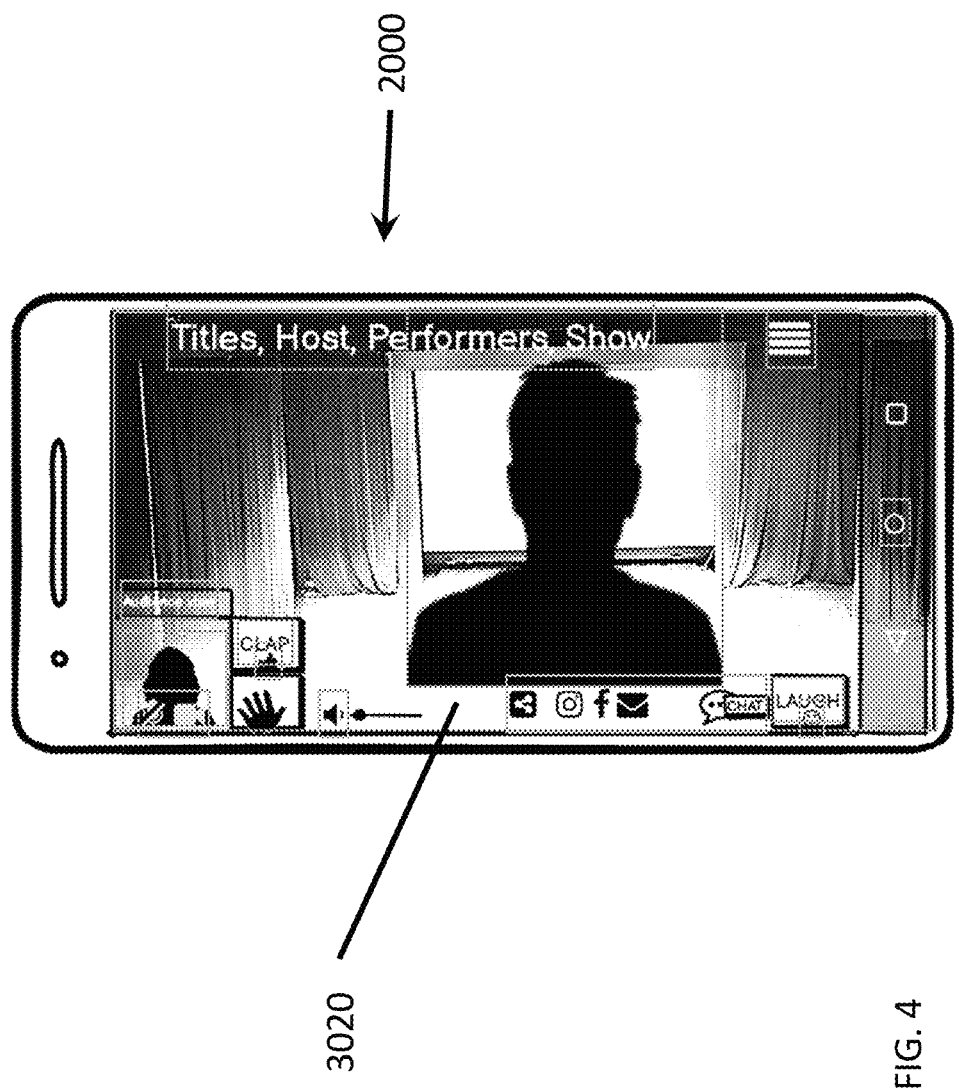
FIG. 4 is a simplified view of aspects of an attendee dashboard as shown generally in FIG. 3, with a front view of a virtual stage shown in full-screen mode.
Figure 5:
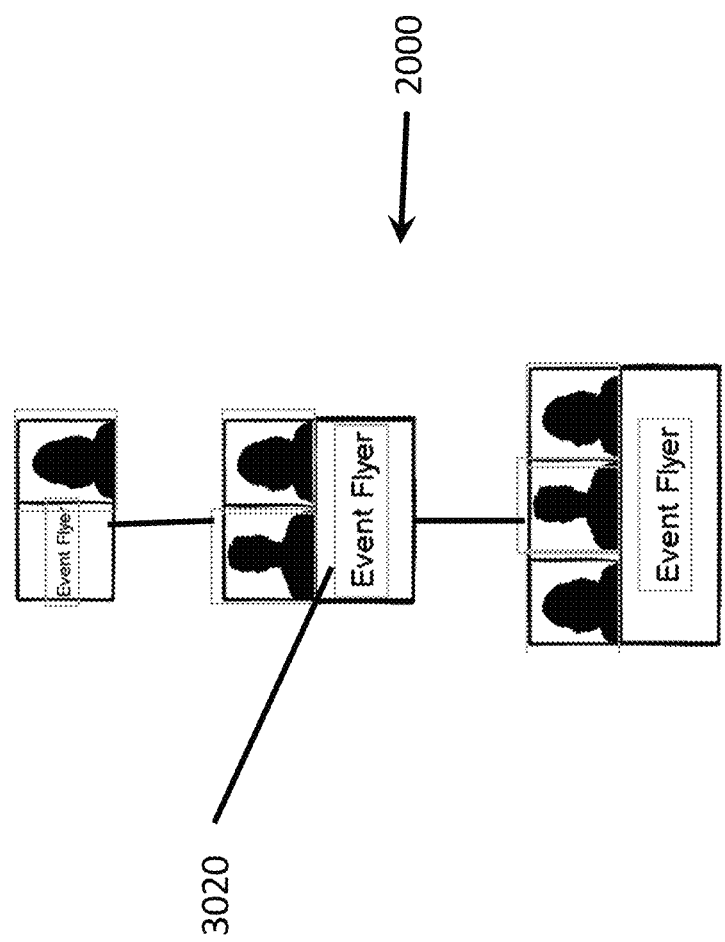
FIG. 5 is a simplified view of aspects of an attendee dashboard of a computer-implemented system as shown generally in FIG. 2, showing options for a photo opportunity.
Figure 6:
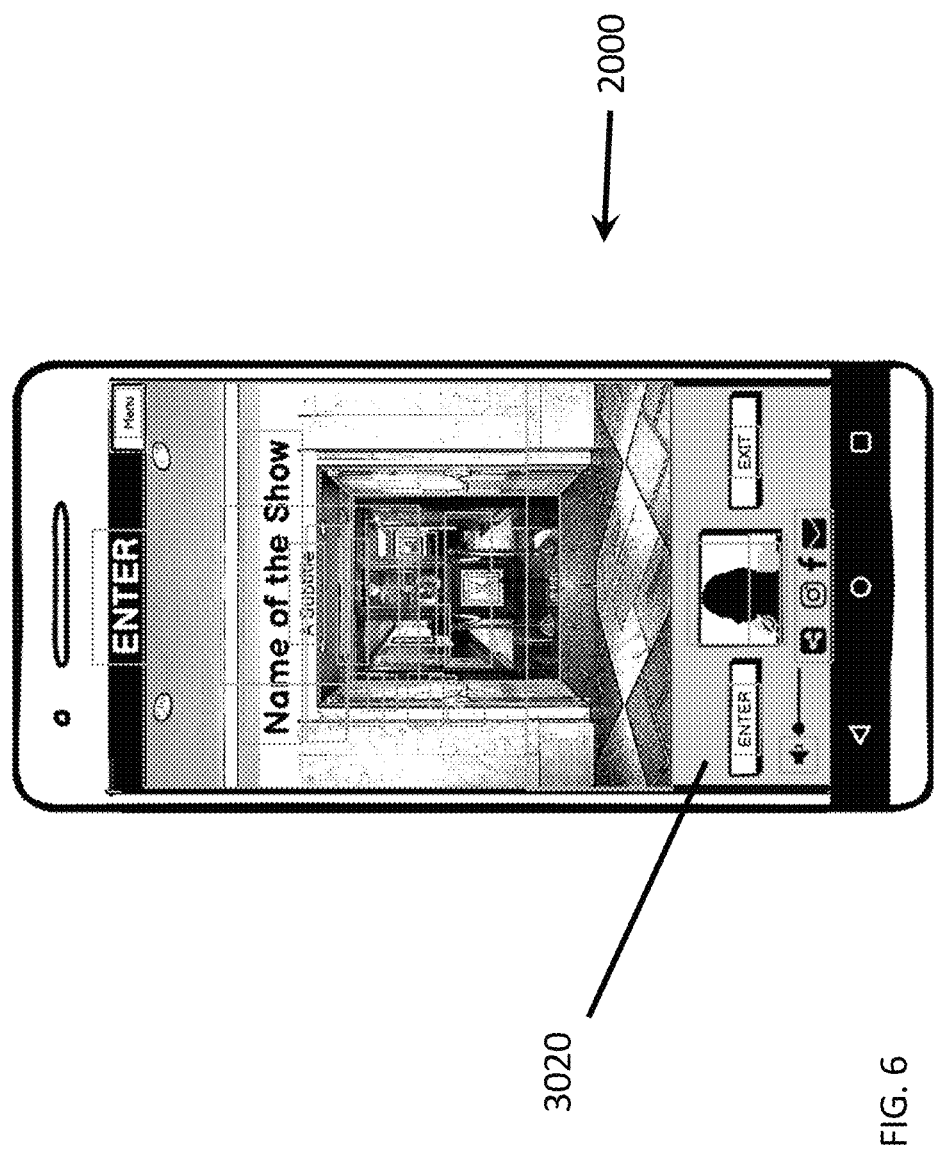
FIG. 6 is a simplified view of aspects of an attendee dashboard of a computer-implemented system as shown generally in FIG. 2, showing a main entrance and lobby of a virtual venue.
Figure 14:
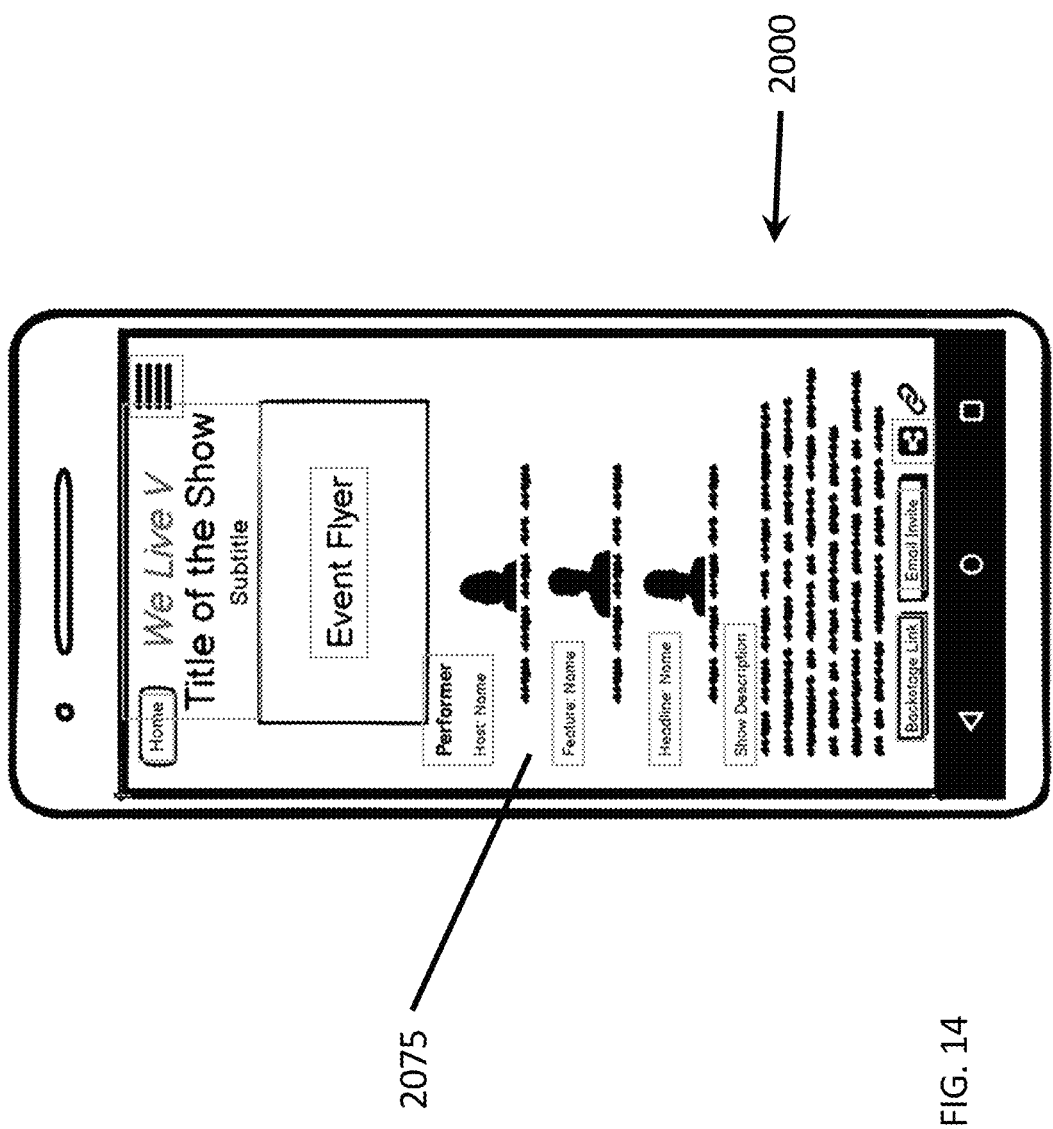
FIG. 14 is a simplified view of aspects of an event management dashboard of a computer-implemented system as shown generally in FIG. 2, depicting event management functions in relation to an event promotion variable.
Figure 15:
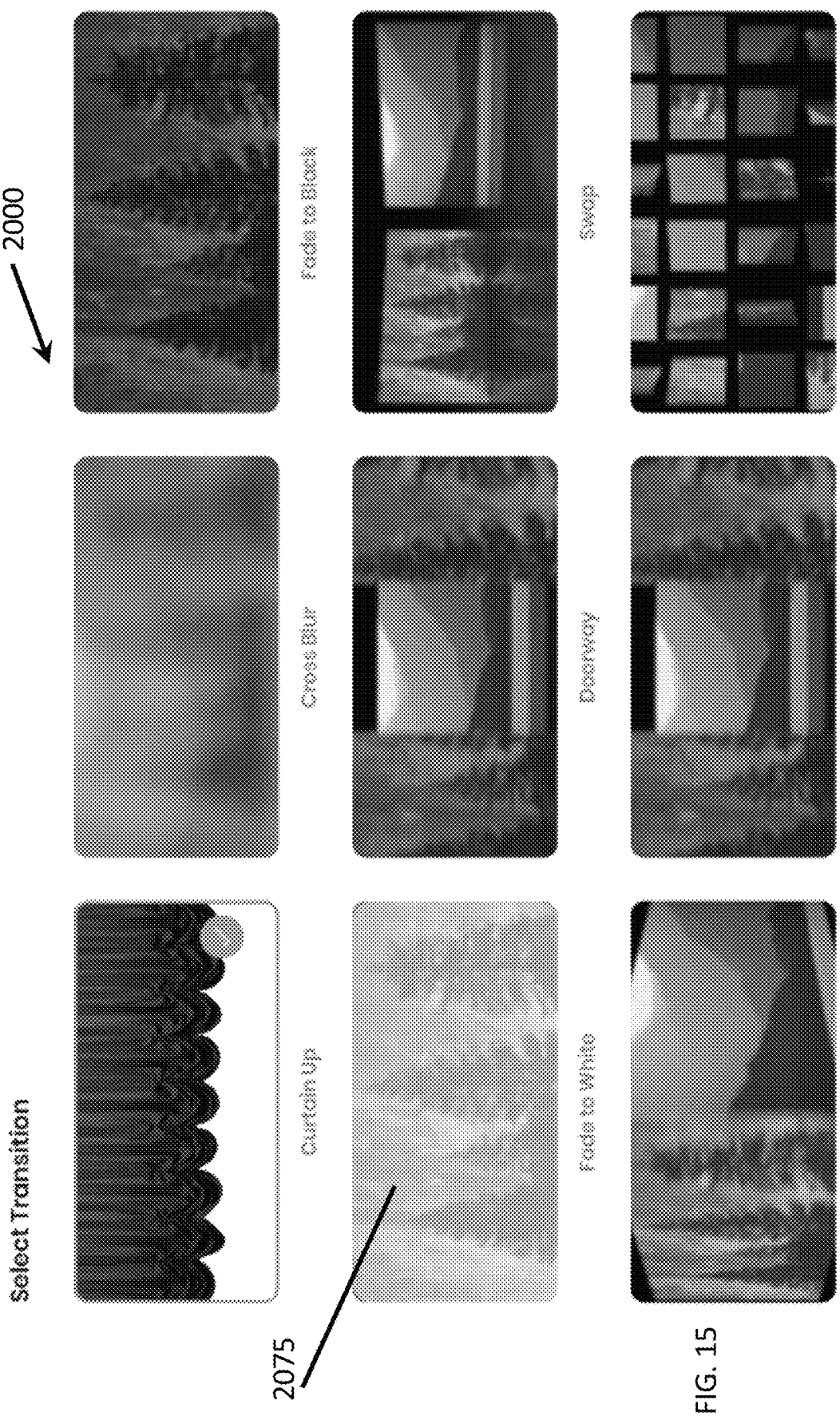
FIG. 15 is a simplified view of aspects of an event management dashboard of a computer-implemented system as shown generally in FIG. 13, depicting performer transition options in an exemplary embodiment.
Figure 16:
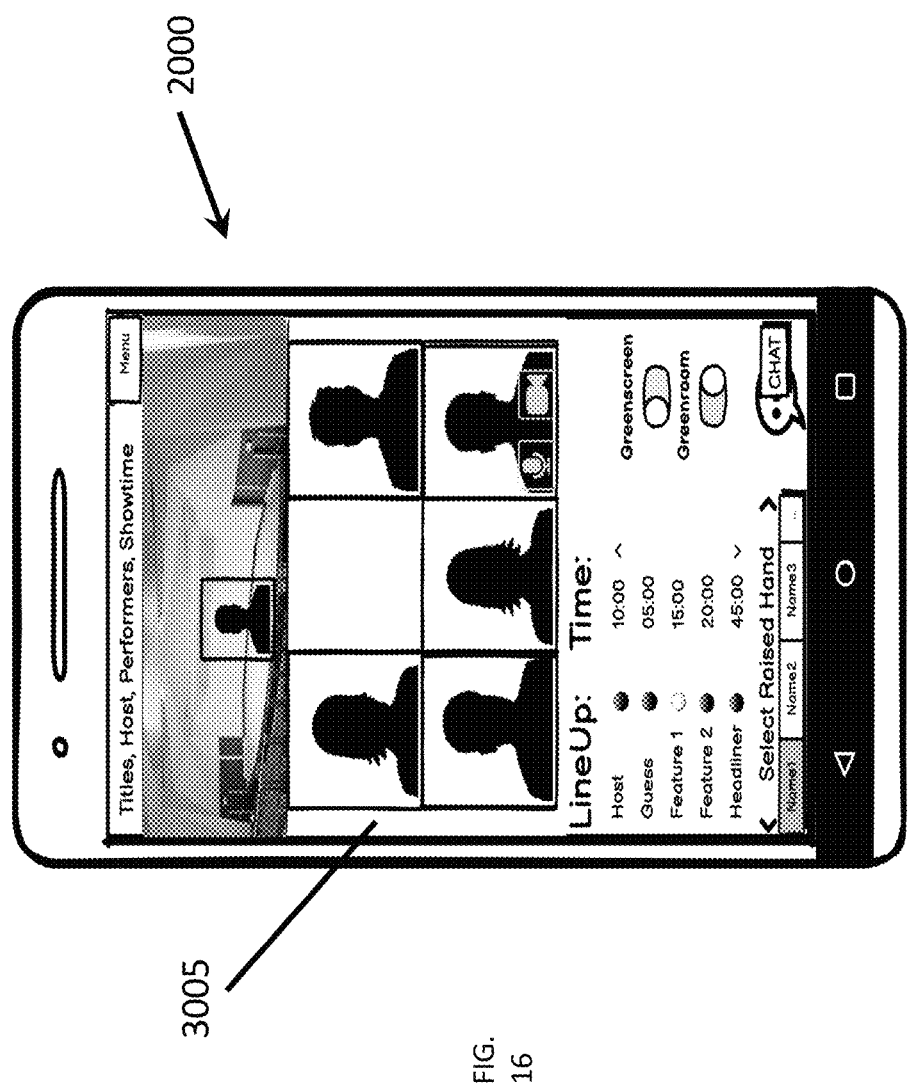
FIG. 16 is a green room in relation to a production suite dashboard in an embodiment.

As shown in FIGS. 14 and 15, such system 2075 may include performer transitions, with selection by production engineer. As shown in FIG. 3 such system 3020 include audio feedback such as a clap variable in reaction to performer performance depicted in show production output including a stream of images. As shown in FIG. 3 such system 3020 include audio feedback such as a laugh variable in reaction to performer performance depicted in show production output including a stream of images. As shown in FIG. 3 such system 3020 include text feedback such as a variable in relation to selection by show production dashboard. As shown in FIG. 3 such system 3020 include verbal feedback such as a variable in reaction to selection by show production dashboard. Feedback options may include, for example, a raised hand-text and/or verbal responses; claps and applause output; laugh and group of laughs output; performer video image transitions in real-time live setting on virtual platform; attendees seating as if they are actually at a theater, where performers may view themselves and/or others in group(s); and, greenroom capabilities on-stage. As shown in FIGS. 14 and 15, such system 2075 include performer transitions in relation to selection of a show production dashboard. Shown in FIG. 16 is exemplary greenroom functionality, which may include green screen functionality. It will be understood that the live performance space also may include green screen functionality, which may be controllable in relation to a show production dashboard, performer dashboard, or both.

Figure 7:
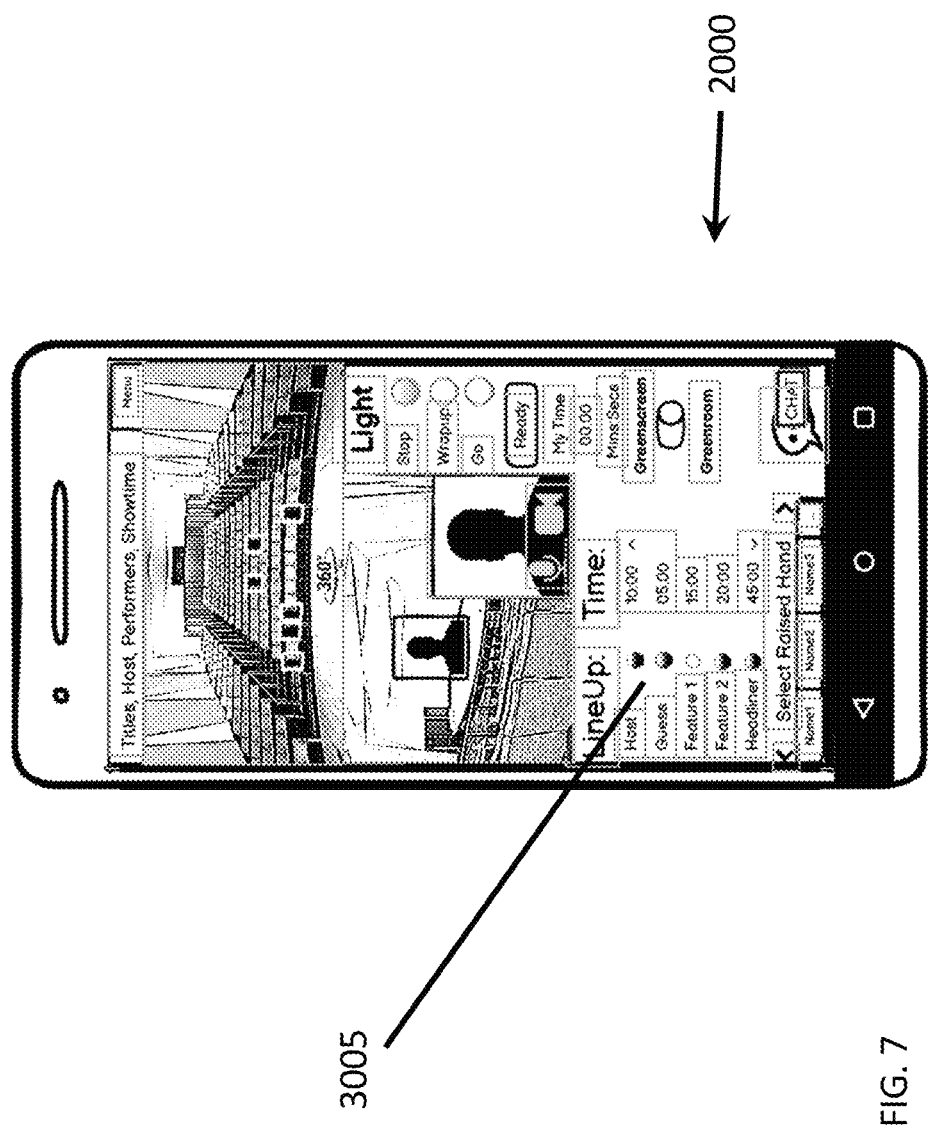
FIG. 7 is a simplified view of aspects of a performance dashboard of a computer-implemented system as shown generally in FIG. 2, showing a view from stage to audience seating area.
Figure 8:
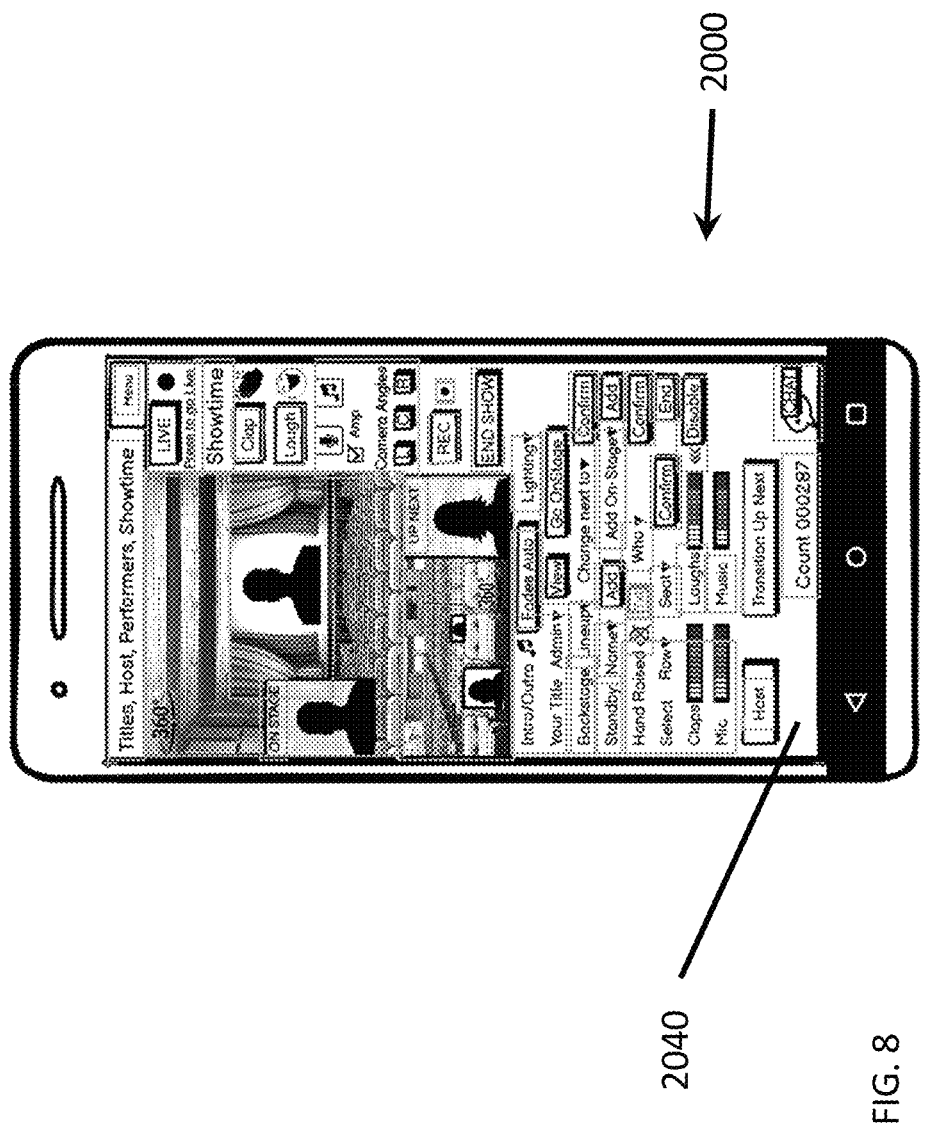
FIG. 8 is a simplified view of aspects of a production suite dashboard of a computer-implemented system as shown generally in FIG. 2, showing a front view of audience attendees from back of the showroom.
Figure 9:
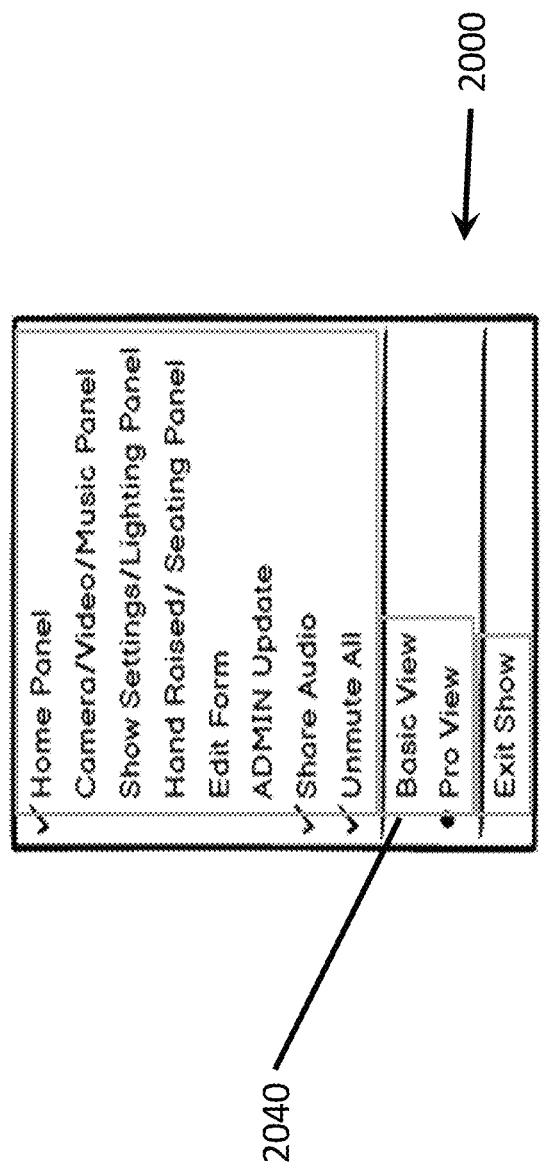
FIG. 9 is a simplified view of aspects of a production suite dashboard of a computer-implemented system as shown generally in FIG. 2, showing a view of an exemplary menu of some show production functions.
Figure 10:
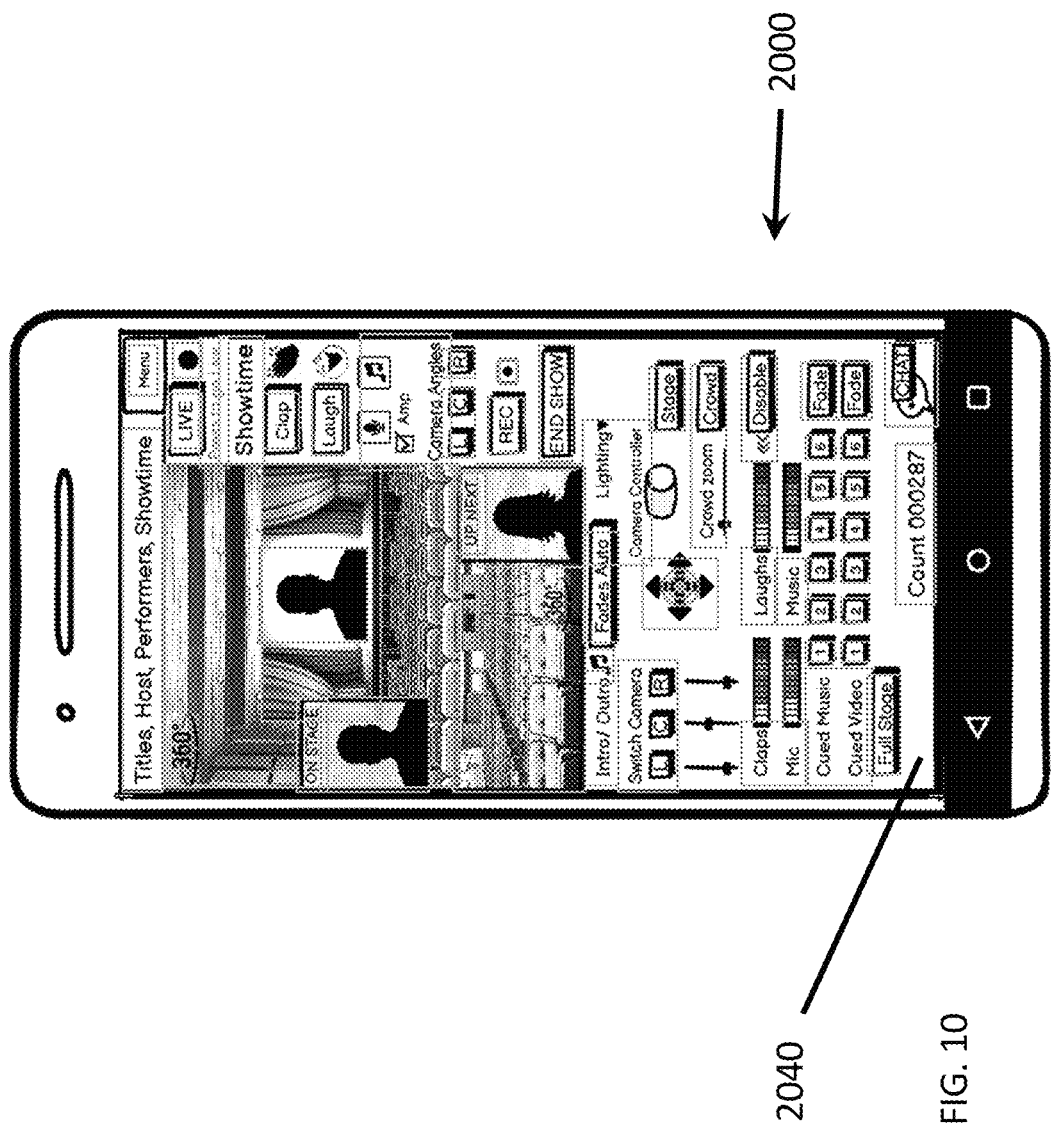
FIG. 10 is a simplified view of aspects of a production suite dashboard of a computer-implemented system as shown generally in FIG. 2, depicting show production functions for determining camera variables.
Figure 11:
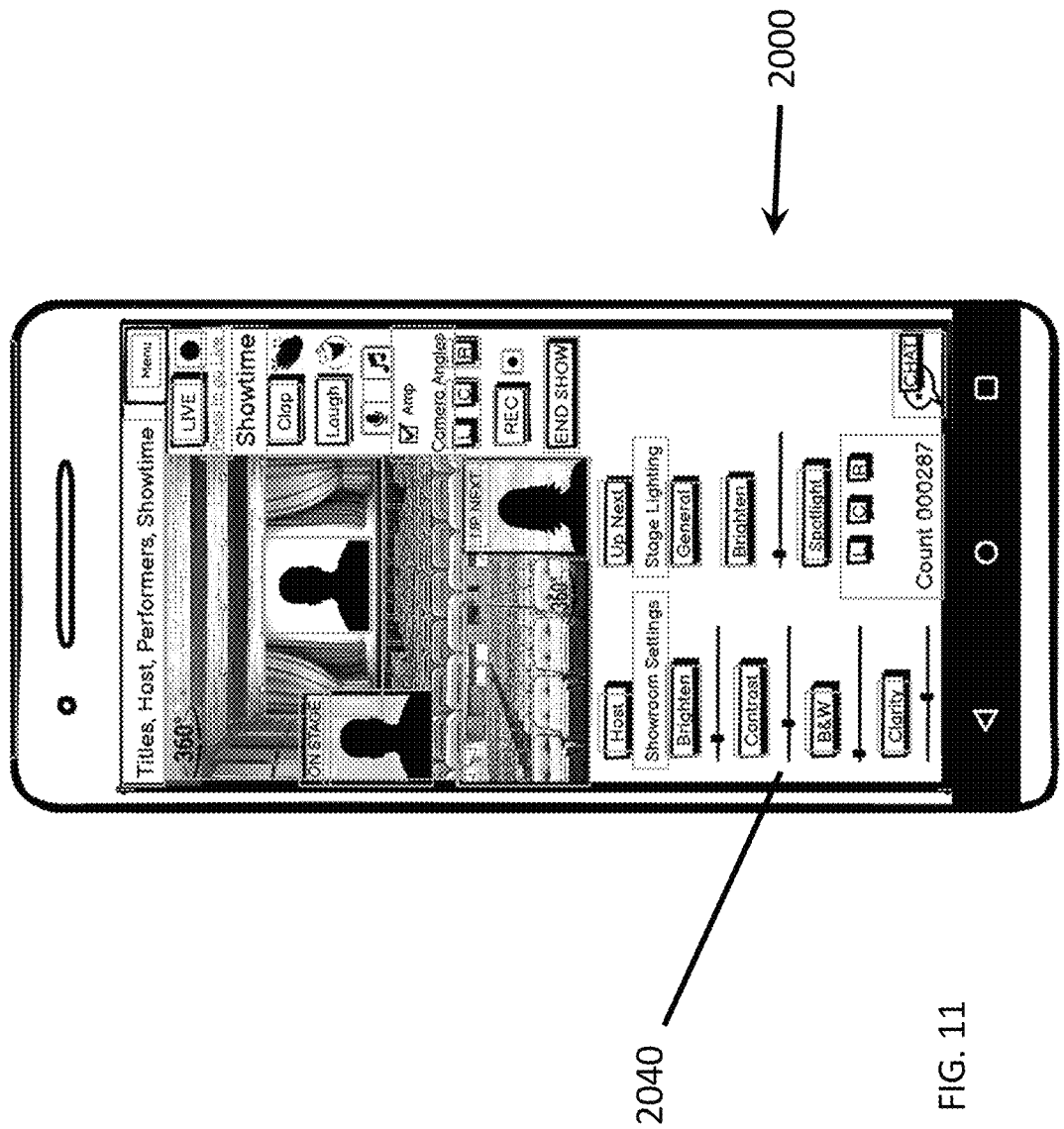
FIG. 11 is a simplified view of aspects of a production suite dashboard of a computer-implemented system as shown generally in FIG. 2, depicting show production functions for determining lighting variables.
Figure 12:
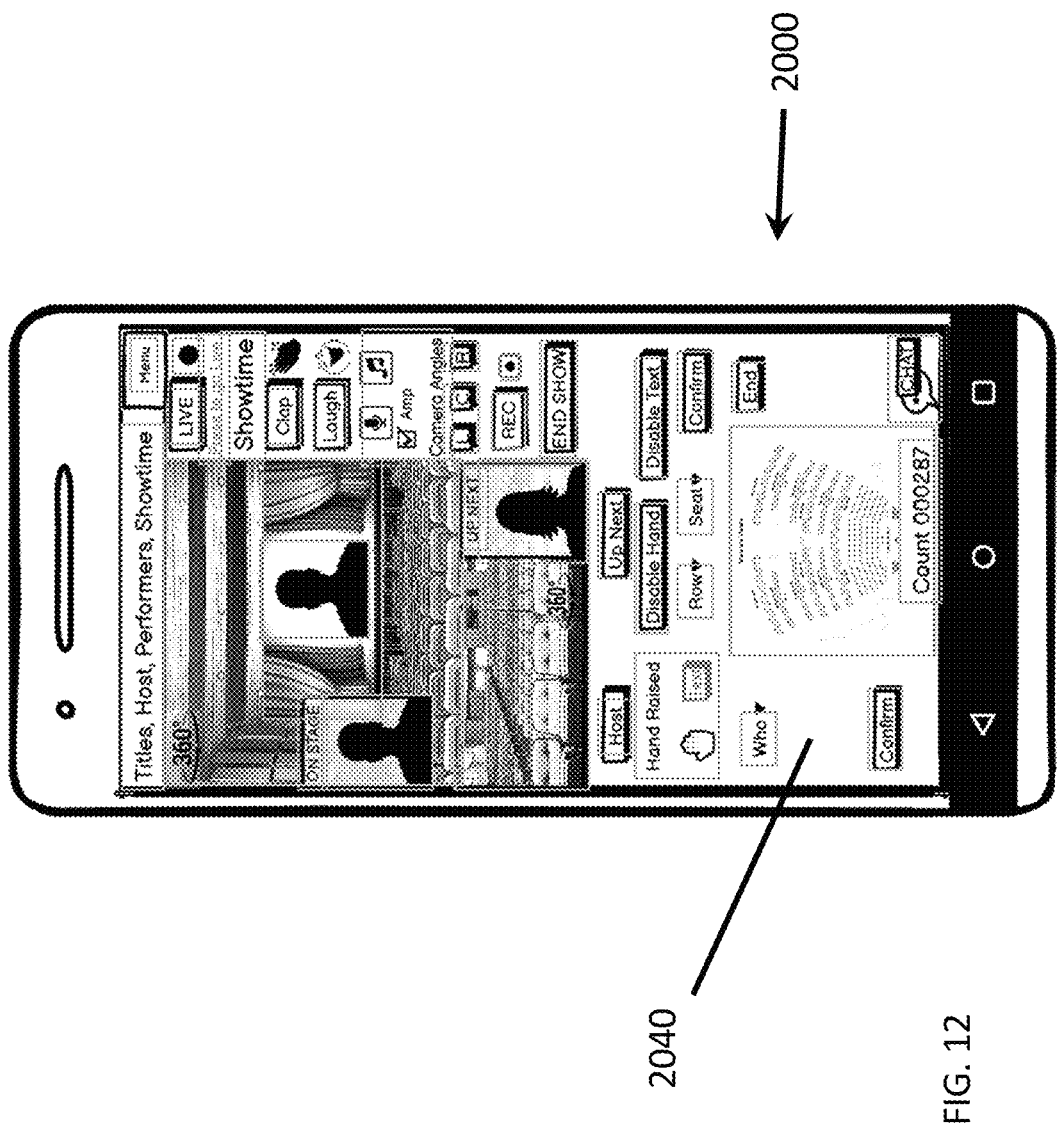
FIG. 12 is a simplified view of aspects of a production suite dashboard of a computer-implemented system as shown generally in FIG. 2, depicting show production functions in relation to attendee devices.

Referring to FIGS. 1 and 7, method 100 may include fourth providing 520 a performer dashboard configured to enable show performance functions from a remote performer device for the event session. In an embodiment, for example, the show performance functions may be selected from the following:
  determining a dress rehearsal variable,
  determining a tech rehearsal variable,
  determining a front live image view of audience variable,
  determining a live image of self-view variable,
  determining a timing variable,
  determining a lineup variable,
  determining an onstage variable,
  determining a backstage variable,
  determining a transitioning variable,
  determining a live image of virtual platform,
  determining performer details variable,
  determining green screen variable,
  determining attendee interaction selection variable,
  determining a performance communication variable,
  determining a production communication variable,
  determining a show change variable,
  determining a stage setting variable, and
  determining a photo-op variable.

Referring to FIGS. 1, 3, 4, 5 and 6, method 100 may include fifth providing 620 an attendee dashboard configured to enable audience attendee functions from a plurality of remote audience attendee devices for the event session. The audience attendee functions may be enabled or controlled by functioning of a plurality of attendee dashboards in relation to attendee input from a respective plurality of audience attendee users. In an embodiment, for example, the remote audience attendee functions may be selected from the following:

determining a ticket condition variable,
    determining audience seating information,
    determining audience subgroup information,
    determining audience invitation information,
    determining a visual output variable,
    determining an audio output variable,
    determining audio feedback variable,
    determining a production applause variable,
    determining a production clapping variable,
    determining a production single laugh variable,
    determining a production laughter variable,
    determining an input contribution to audience audio variable,
    determining an input contribution to audience visual variable,
    determining an interpersonal interaction gesture contribution,
    determining an interpersonal interaction comment contribution,
    determining an interpersonal contribution to a subgroup photo-op variable,
    determining a souvenir purchase variable,
    determining a refreshment purchase variable,
    determining an event series purchase variable,
    determining a virtual venue walking route variable,
    determining a chat sub-group variable,
    determining an interpersonal interaction intermission contribution, and
    determining an interpersonal voluntary financial contribution variable.

As shown in FIG. 3, such system 3020 may include audio feedback such as a clap variable to receive reaction from performer performance. As shown in FIG. 3, such system 3020 may include audio feedback such as a laugh variable in reaction from performer performance. As shown in FIG. 3, such system 3020 may include text feedback such as a variable in reaction to selection by production engineer. As shown in FIG. 3, such system 3020 may include verbal feedback such as a variable in reaction to selection by production engineer.

Referring to FIGS. 1, 8, 9, 10, 11 and 12 method 100 may include sixth providing 720 a production suite dashboard configured to enable show production functions from a remote show production device for the event session. The show production functions may be provided in relation to show production input including the stream of images.

Referring to FIGS. 1, 8, 9, 10, 11 and 12 method 100 may include seventh providing 820 show production output in relation to the show production input including the stream of images. The show production output may include show production features in relation to a plurality of show production functions provided in relation to the stream of images. In an embodiment, for example, the show production features, show production functions, or both, may be selected from the following:

determining a stage lighting variable,
    determining a production audio variable,
    determining a house lighting variable,
    determining a green screen variable,
    determining a performance start variable,
    determining a performance end variable,
    determining a production programming variable,
    determining a performance introduction variable,
    determining a performance transition variable,
    determining a production applause variable,
    determining a production clapping variable,
    determining a production single laugh variable,
    determining a production laughter variable,
    determining a production audience instruction variable,
    determining a stage microphone variable,
    determining a production music variable,
    determining a production mute variable,
    determining a production camera angle variable,
    determining a production recording variable,
    determining a showroom status variable,
    determining a private view variable,
    determining a production queue variable,
    determining a performance lineup variable,
    determining a stage transition variable,
    determining a performance timing variable,
    determining a camera feeds variable,
    determining a camera feed multiplexing variable,
    determining a backstage variable,
    determining an attendee selection variable,
    determining an attendee mute variable,
    determining a host variable,
    determining a next performer variable,
    determining an attendee count variable,
    determining a camera control variable,
    determining a camera switch variable,
    determining a camera angle switch variable,
    determining a spotlight variable,
    determining a show setting variable,
    determining an attendee hand-raised variable,
    determining a share audio variable,
    determining a show edit variable,
    determining a production change variable,
    determining a performer variable,
    determining a showroom preview variable,
    determining a dress rehearsal variable,
    determining a timing variable,
    determining a lineup variable,
    determining an onstage variable,
    determining a backstage variable,
    determining a performance communication variable,
    determining a production communication variable,
    determining an effects variable,
    determining a remote show device control variable,
    determining a physical environment control variable of a live performance space,
    and
    determining a show change variable.

Figure 17:
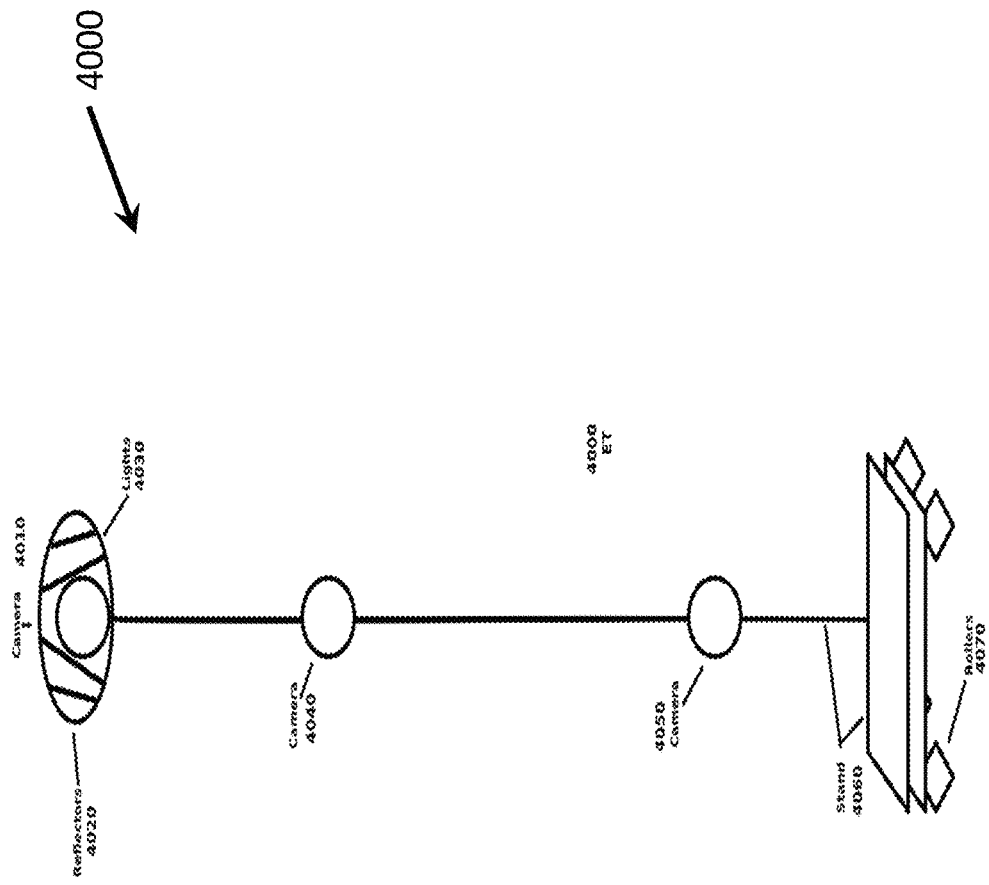
FIG. 17 is a remote equipment that will allow the production engineer to control the physical environment while at a different location.

Shown in FIG. 16, for example, is a show production feature including a green room of a production suite dashboard in an embodiment. Shown in FIG. 17, for example, is a remote equipment that enables a production suite dashboard to control show production features including a physical environment variable of a live performance space from a different location that is remote from the live performance space. In an embodiment, for example, a production suite dashboard, an event management dashboard, or both may provide show production functions that may be selected from the following: (i) a remote show device in an embodiment may include show production functions of lighting of live performance space, which may be exclusive or in combination with other production functions; (ii) a remote show device in an embodiment may include show production functions of transmitting live video feed, which may be exclusive or in combination with other production functions; (iii) a remote show device in an embodiment may include show production functions of input and output of audio, which may be exclusive or in combination with other production functions; and (iv) a remote show device in an embodiment may include show production functions of scanning live performance space, which may be exclusive or in combination with other production functions.

Referring to FIGS. 1, 6, 7, 8, 10, 11, 12 and 15, method 100 may include eighth providing 920 virtual venue output in relation to the show production output including the stream of images. The virtual venue output may include an appearance feature of virtual venue output including views of a virtual venue model. The virtual venue model, without limitation, may include a main entrance, main lobby, showroom, audience seating, orchestra pit, stage, backdrop, backstage, and green room. Audience seating may include seats, rows, sections, and boxes of a selected virtual venue model. Virtual venue model, for example, may be a model of an indoor theatre venue or outdoor theatre venue (i.e. showroom), which may exist only in virtual form or may be a model of a plurality of real-world venue arrangements. Virtual venue model, in an embodiment, may be a model of a particular real world live performance venue.

Referring to FIGS. 1, 3, 4, 7, 8, 9 and 10, method 100 may include ninth providing 1020 audience composition output in relation to the show production output. The audience composition output may include an aggregate representation of audience responses for a plurality of the remote audience attendee devices in relation to the show production output. The audience composition output may include an aggregate representation of a plurality of audience responses of a plurality of the remote audience attendee devices in relation to attendee input from a respective plurality of audience attendee users. Such ninth providing 1020 audience composition output in relation to the show production output may further include ninth prime receiving audience responses of the plurality of the remote audience attendee devices in relation to the show production output. Such ninth providing 1020 audience composition output in relation to the show production output may further include ninth double prime providing the audience composition output in relation to the ninth prime receiving audience responses of the plurality of the remote audience attendee devices in relation to the show production output. In an embodiment, the audience responses may be selected from the following: claps output of the plurality of the remote audience attendee devices in relation to the show production output, applause output of the plurality of the remote audience attendee devices in relation to the show production output, and laughs output of the plurality of the remote audience attendee devices in relation to the show production output.

Referring to FIGS. 1, 3, 4, 7, 9, 10, 11, 12 and 16, method 100 may include tenth providing 1120 interpersonal audience interaction output in relation to each particular of the plurality of audience attendee devices. The interpersonal audience interaction output may include interpersonal responses of a plurality of subgroup attendee devices proximate, or surrounding, the particular audience attendee device in virtual audience seating. The interpersonal audience interaction output of any particular one of the plurality of audience attendee devices may be produced in relation to interpersonal interaction response input received from the plurality, or any, of the subgroup attendee devices proximate the particular audience attendee device in virtual audience seating. Thus, any particular one of the plurality of audience attendee devices may be excluded from receiving interpersonal interaction response input of distant devices which are not proximate, or surrounding, the particular audience attendee device in virtual audience seating. So, for example, an audience attendee device corresponding to a seat in the front row of virtual audience seating will be excluded from exchanging or receiving interpersonal interaction response input of another audience attendee device corresponding to a seat in the rear row of the balcony of virtual audience seating. Such tenth providing 1120 interpersonal audience interaction output in relation to each particular of the plurality of audience attendee devices may further include tenth prime receiving interpersonal responses of the plurality of subgroup attendee devices proximate the particular remote audience attendee device in the virtual audience seating. Such tenth providing 1120 interpersonal audience interaction output in relation to each particular of the plurality of audience attendee devices may further include tenth double prime providing the interpersonal audience interaction output in relation to the tenth prime receiving interpersonal responses of said plurality of subgroup attendee devices proximate the particular attendee device in said virtual audience seating. In an embodiment, the interpersonal responses may be selected from the following: interpersonal gesture output of the plurality of subgroup attendee devices in relation to the particular attendee device, and interpersonal comment output of the plurality of subgroup attendee devices in relation to the particular attendee device.

Referring to FIG. 1, method 100 may include eleventh providing 1220 the show production output to a real-time interactive video communications platform to communicate same to the plurality of remote audience attendee devices for attendees to view the show production output embodying the show. Referring to FIG. 1, method 100 may include twelfth providing 1320 the virtual venue output to the real-time interactive video communications platform to communicate same to the plurality of remote audience attendee devices for attendees to view the virtual venue output in relation to the show production output embodying the show. Referring to FIG. 1, method 100 may include thirteenth providing 1420 the audience composition output to the real-time interactive video communications platform to communicate same to the plurality of remote audience attendee devices for attendees to experience the audience composition output in relation to the show production output embodying the show. Referring to FIG. 1, method 100 may include fourteenth providing 1520 the interpersonal audience output to the real-time interactive video communications platform to communicate same to the plurality of particular remote audience attendee devices for attendees to experience the interpersonal audience output in relation to the show production output embodying the show.

Referring to FIG. 1, method 100 may include first inputting 1530 the show production output by the real-time interactive video communications platform to communicate same to the plurality of remote audience attendee devices for attendees to view the show production output embodying the show. Referring to FIG. 1, method 100 may include second inputting 1550 the virtual venue output to the real-time interactive video communications platform to communicate same to the plurality of remote audience attendee devices for attendees to experience the virtual venue output in relation to the show production output embodying the show. Referring to FIG. 1, method 100 may include third inputting 1570 the audience composition output to the real-time interactive video communications platform to communicate same to the plurality of remote audience attendee devices for attendees to experience the audience composition output in relation to the show production output embodying the show. Referring to FIG. 1, method 100 may include fourth inputting 1590 the audience output to the real-time interactive video communications platform to communicate same to the plurality of particular remote audience attendee devices for attendees to experience the audience interaction output in relation to the show production output embodying the show.

Figure 2:
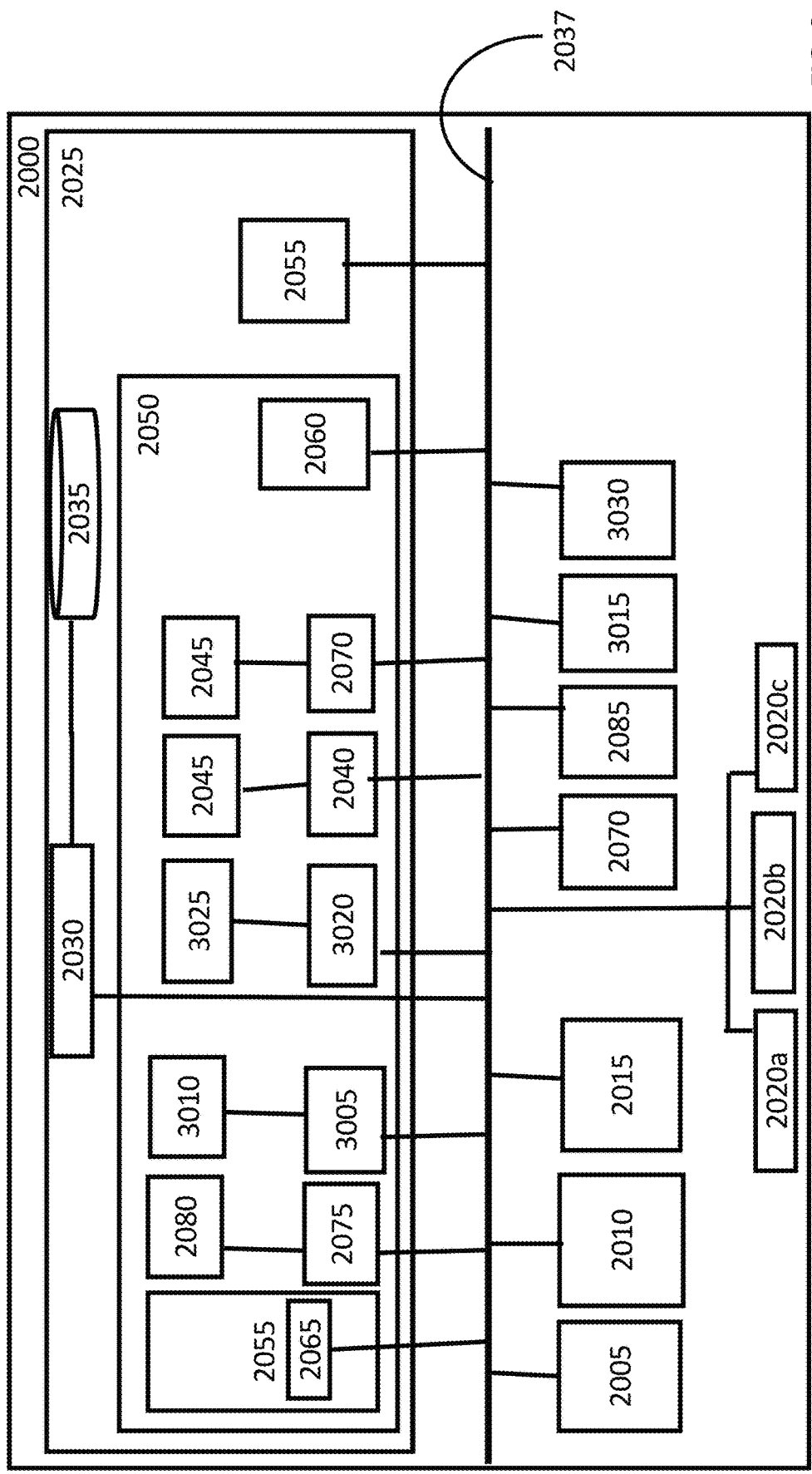
FIG. 2 is a simplified block diagram view of a computer-implemented system for providing real-time interactive video communications of a show from a live physical performance space in relation to a virtual performance venue to a remote plurality of attendee devices, in an embodiment.

Referring to FIG. 2, a computer-implemented system 2000 may be configured to provide real-time interactive video communications of a show performed by performers from a live physical performance space 2005 in relation to a virtual performance venue 2010 to an audience group 2015 (or "audience") including a plurality of remote audience attendee devices 2020 (including particular devices 2020a, 2020b, 2020c) dispersed at remote locations apart from the live physical performance space 2005. In an embodiment, system 2000 may be particularly configured to perform the method 100 elsewhere described herein and illustrated in FIG. 1, or other method providing real-time interactive video communications of a show as disclosed herein. In embodiments, system 2000 may include computer hardware arrangement 2025 including one or more processors 2030 (or "processor 2030") coupled to memory 2035 to process instructions accessed in the memory 2035. In an embodiment, the one or more processors 2030 may be cloud processor resources. The processor 2030 may be operably connected to a system bus 2037 or other communications channel. Processor 2030 may be configured to perform or execute steps accessed in a non-transitory computer-accessible medium having stored thereon computer-executable instructions (hereinafter "application") for providing real-time interactive video communications of a show from a live physical performance space 2005 in relation to a virtual performance venue 2010 to an audience 2015 of a plurality of remote audience attendee devices 2020 dispersed at remote locations apart from the live physical performance space 2005, wherein, when a computer hardware arrangement 2025 executes the instructions embodied in the application, the computer hardware arrangement 2025 is configured to perform procedures of a method for providing real-time interactive video communications of a show performed by performers from a live physical performance space 2005 in relation to a virtual performance venue 2010, to an audience 2015 of a plurality of remote audience attendee devices 2020 dispersed at remote locations apart from the live physical performance space 2005. In such system 2000, the application may include a live performance platform application 2050 configured for operation in relation to a real-time interactive video communications platform 2055. In an embodiment as shown in FIG. 2, such system 2000, may include a real-time interactive video communications platform 2055 configured for operation in relation to the live performance platform application 2050. In an embodiment (not shown), a system as disclosed, in the alternative, may include a live performance platform application configured for communications with an external, general purpose real-time interactive video communications platform (not shown), such as a cloud-based general purpose real-time interactive video communications platform.

Returning to FIG. 2, system 2000 may include processor 2030 configured to execute the live performance platform application 2050 configured to perform steps of a method as disclosed herein and embodied in application 2050. System 2000 may include an event session 2060 corresponding to the live physical performance space 2005. System 2000 may include the processor 2030 configured to manage a stream of images 2065 of a field of view captured by a live 505 video camera 2070 trained on the live physical performance space 2005 for the event session 2060. System 2000 may include the processor 2030 configured to provide an event management dashboard 2075 configured to enable event management functions 2080 from a remote event management device 2085 for the event session 2060. System 2000 may include the processor 2030 configured to provide a performer dashboard 3005 configured to enable show performance 510 functions 3010 from a remote performer device 3015 for the event session 2060. System 2000 may include the processor 2030 configured to provide an attendee dashboard 3020 configured to enable audience attendee functions 3025 from a plurality of remote attendee devices 3030 for the event session 2060. System 2000 may include the processor 2030 configured to provide a production suite dashboard 2040 configured to enable show production functions 2045 from a remote show production device 2050 for event session 2060, and the show production functions 2045 may be provided in relation to show production input 2055 including the stream of images 2065. System 2000 may include the processor 2030 configured to provide said show production output 2070 in relation to show production input 2075. The show production features may be provided in relation to show production functions 2045 in relation to the stream of images 2065.

Apparatus, methods, and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods, and apparatus described herein, one of ordinary skill in the art will appreciate that implementations can be made for other fields of art, systems, apparatus, or methods that provide the required functions. The invention should therefore not be limited by the above-described embodiments, methods, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

Terminology used in the present disclosure is intended to include all environments and alternate technologies that provide the same functionality described herein.

What is claimed is:

1. A computer-implemented method for providing real-time interactive video communications of a show from a live physical performance space in relation to a virtual performance venue to an audience of a plurality of attendee devices dispersed at remote locations apart from the live physical performance space, said method comprising:
providing a live performance platform application configured for operation in relation to a real-time interactive video communications platform;
executing, by a processor, said live performance platform application configured to perform the following:
providing an event session corresponding to the live physical performance space;
managing a stream of images of a live camera field of view captured by a live video camera trained on the live physical performance space for said event session;
providing an event management dashboard configured to enable event management functions from a remote event management device for said event session;
providing a performer dashboard configured to enable show performance functions from a remote performer device for said event session;
providing an attendee dashboard configured to enable audience attendee functions from a plurality of remote attendee devices for said event session, wherein said audience attendee functions includes selecting a plurality of real-time interactive audio feedback variables comprising at least a selected one of a clap variable, applause variable, laugh variable, visual output and audio output;
providing a production suite dashboard configured to enable real-time interactive show production functions for determining lighting, audio, performer transition and camera variables from a remote show production device for said event session, said show production functions provided in relation to show production input comprising said stream of images; and
providing said show production output in relation to said show production input, said show production output comprising show production features in relation to said show production functions in relation to said stream of images.

2. A computer-implemented method of claim 1, further comprising:
said live performance platform application configured to perform the following:
providing virtual venue output in relation to said show production output, said virtual venue output comprising an appearance feature of a virtual venue.

3. A computer-implemented method of claim 1, further comprising:
said live performance platform application configured to perform the following:
providing audience composition output in relation to said show production output, said audience composition output comprising audience responses of a plurality of the audience attendee devices in relation to said show production output.

4. A computer-implemented method of claim 1, further comprising:
said live performance platform application configured to perform the following:
providing interpersonal audience interaction output in relation to a particular attendee device, said interpersonal audience interaction output comprising interpersonal responses of a plurality of subgroup attendee devices proximate the particular attendee device in virtual audience seating.

5. A computer-implemented method of claim 1, further comprising:
providing said show production output to the real-time interactive video communications platform to communicate same to the plurality of attendee devices.

6. A computer-implemented method of claim 2, further comprising:
providing said virtual venue output to said real-time interactive video communications platform to communicate same to the plurality of attendee devices.

7. A computer-implemented method of claim 3, further comprising:
providing said audience composition output to said real-time interactive video communications platform to communicate same to the plurality of attendee devices.

8. A computer-implemented method of claim 4, further comprising:
providing said interpersonal audience output to said real-time interactive video communications platform to communicate same to the particular attendee device.

9. A computer-implemented method of claim 1, further comprising:
said live performance platform application configured to perform the following:
inputting said show production output to the real-time interactive video communications platform to communicate to the plurality of attendee devices.

10. A computer-implemented method of claim 6, further comprising:
said live performance platform application configured to perform the following:
inputting said virtual venue output to said real-time interactive video communications platform to communicate same to the plurality of attendee devices.

11. A computer-implemented method of claim 7, further comprising:
said live performance platform application configured to perform the following:
inputting said audience composition output to said real-time interactive video communications platform to communicate same to the plurality of attendee devices.

12. A computer-implemented method of claim 8, further comprising: said live performance platform application configured to perform the following:
inputting said interpersonal audience output to said real-time interactive video communications platform to communicate same to the particular attendee device.

13. A computer-implemented method of claim 3, further comprising:
said live performance platform application configured to perform the following:
receiving audience responses of said plurality of the attendee devices in relation to said show production output;
providing said audience composition output in relation to said receiving audience responses of said plurality of the attendee devices in relation to said show production output.

14. A computer-implemented method of claim 13, further comprising:
said audience responses selected from the following:
claps output of said plurality of the audience attendee devices in relation to said show production output;
applause output of said plurality of the audience attendee devices in relation to said show production output;
laughs output of said plurality of the audience attendee devices in relation to said show production output;
and group of laughs output of said plurality of the audience attendee devices in relation to said show production output.

15. A computer-implemented method of claim 4, further comprising:
said live performance platform application configured to perform the following:
receiving interpersonal responses of said plurality of subgroup attendee devices proximate the particular attendee device in said virtual audience seating;
providing said interpersonal audience interaction output in relation to said receiving interpersonal responses of said plurality of subgroup attendee devices proximate the particular attendee device in said virtual audience seating.

16. A computer-implemented method of claim 15, further comprising:
said interpersonal responses selected from the following:
interpersonal gesture output of said plurality of subgroup attendee devices in relation to the particular attendee device; and
interpersonal comment output of said plurality of subgroup attendee devices in relation to the particular attendee device.

17. A computer-implemented method of claim 1, further comprising:
said live performance platform application configured to perform the following:
said event management functions selected from the following:
determining an event session,
determining house lighting,
determining house music,
determining a ticket condition variable,
determining audience seating information,
determining audience subgroup information,
determining audience invitation information,
determining an audience variable,
determining a photo-op variable,
determining a souvenir purchase variable,
determining a refreshment purchase variable,
determining an event series subscription purchase variable,
determining a virtual venue walking route variable,
determining an intermission variable,
determining a voluntary financial contribution variable,
determining an attendee count variable,
determining an attendee selection variable,
determining an attendee mute variable,
determining an event page variable,
determining an advertisement variable.

18. A computer-implemented method of claim 1, further comprising:
said live performance platform application configured to perform the following:
said performance functions selected from the following:
determining a dress rehearsal variable,
determining a tech rehearsal variable,
determining front view of audience variable,
determining a timing variable,
determining a lineup variable,
determining an onstage variable,
determining a backstage variable,
determining a performance communication variable,
determining a production communication variable,
determining a show change variable,
determining a stage setting variable,
determining a photo-op variable.

19. A computer-implemented method of claim 1, further comprising:
said live performance platform application configured to perform the following:
said attendee functions selected from the following:
determining a ticket condition variable,
determining audience seating information,
determining audience subgroup information,
determining audience invitation information,
determining a visual output variable,
determining an audio output variable,
determining an input contribution to audience audio variable,
determining an input contribution to audience visual variable,
determining an interpersonal interaction gesture contribution,
determining an interpersonal interaction comment contribution,
determining an interpersonal contribution to a subgroup photo-op variable,
determining a souvenir purchase variable,
determining a photo opt purchase variable,
determining a group photo opt purchase variable,
determining a refreshment purchase variable,
determining an event series purchase variable,
determining a virtual venue walking route variable,
determining an interpersonal interaction intermission contribution,
determining an interpersonal voluntary financial contribution variable.

20. A computer-implemented method of claim 1, further comprising:
said live performance platform application configured to perform the following:
said show production functions selected from the following:
determining a show form variable,
determining a stage lighting variable,
determining a production audio variable,
determining a house lighting variable,
determining a performance start variable,
determining a performance end variable,
determining a production programming variable,
determining a performance introduction variable,
determining a performance transition variable,
determining a production applause variable,
determining a production clapping variable,
determining a production laughing variable,
determining a production raised hand variable,
determining a production audience instruction variable,
determining a stage microphone variable, determining a production music variable,
determining a production mute variable,
determining a production camera angle variable,
determining a production recording variable,
determining a showroom status variable,
determining a private view variable,
determining a production queue variable,
determining a performance lineup variable,
determining a stage transition variable,
determining a performance timing variable,
determining a camera feeds variable,
determining a camera feed multiplexing variable,
determining a backstage variable,
determining an attendee selection variable,
determining an attendee mute variable,
determining a host variable,
determining a next performer variable,
determining an attendee count variable,
determining a camera control variable,
determining a camera switch variable,
determining a spotlight variable,
determining a show setting variable,
determining an attendee hand-raised variable,
determining a share audio variable,
determining a show edit variable,
determining a production change variable,
determining a performer variable,
determining a showroom preview variable,
determining a dress rehearsal variable,
determining a tech rehearsal variable,
determining a timing variable,
determining a lineup variable,
determining an onstage variable,
determining a backstage variable,
determining a performance communication variable,
determining a production communication variable,
determining an effects variable,
determining a show change variable.

21. A computer-implemented method of claim 1, further comprising:
said live performance platform application configured to perform the following:
a function selected from the following:
determining an audience attendee device point of view,
determining a show production device point of view,
determining a performer device point of view, and
determining an event administrator device point of view.

22. A non-transitory computer-accessible medium having stored thereon computer-executable instructions for providing real-time interactive video communications of a show from a live physical performance space in relation to a virtual performance venue to an audience of a plurality of attendee devices dispersed at remote locations apart from the live physical performance space, wherein, when a computer hardware arrangement executes the instructions, the computer hardware arrangement is configured to perform procedures comprising:
providing a live performance platform application configured for operation in relation to a real-time interactive video communications platform;
executing, by a processor, said live performance platform application configured to perform the following:
providing an event session corresponding to the live physical performance space;
managing a stream of images of a field of view captured by a live video camera trained on the live physical performance space for said event session;
providing an event management dashboard configured to enable event management functions from a remote event management device for said event session;
providing a performer dashboard configured to enable show performance functions from a remote performer device for said event session;
providing an attendee dashboard configured to enable audience attendee functions from a plurality of remote attendee devices for said event session, wherein said audience attendee functions includes selecting a plurality of real-time interactive audio feedback variables comprising at least a selected one of a clap variable, applause variable, laugh variable, visual output and audio output;
providing a production suite dashboard configured to enable real-time interactive show production functions for determining lighting, audio, performer transition and camera variables from a remote show production device for said event session, said show production functions provided in relation to show production input comprising said stream of images; and
providing said show production output in relation to said show production input, said show production output comprising show production features in relation to said show production functions in relation to said stream of images.

23. A computer-implemented system configured to perform the method of claim 1.

24. A computer-implemented method of claim 1, further comprising:
said show production suite dashboard further configured to enable said production functions for determining an attendee mute variable;
wherein said attendee mute variable is configured to enable said attendee dashboard to select said plurality of at least one of clap variable and laugh variable.

* * * * *